United States Patent
Cai et al.

(10) Patent No.: US 9,713,179 B2
(45) Date of Patent: Jul. 18, 2017

(54) CONFIGURATION OF LAYER-1 DESTINATION ADDRESS FOR DEVICE-TO-DEVICE COMMUNICATIONS

(71) Applicant: Alcatel-Lucent USA Inc., Murray Hill, NJ (US)

(72) Inventors: Yigang Cai, Naperville, IL (US); Anil Rao, Redmond, WA (US)

(73) Assignee: Alcatel Lucent, Boulogne-Billancourt (FR)

( * ) Notice: Subject to any disclaimer, the term of this patent is extended or adjusted under 35 U.S.C. 154(b) by 315 days.

(21) Appl. No.: 14/318,361

(22) Filed: Jun. 27, 2014

(65) Prior Publication Data

US 2015/0382385 A1   Dec. 31, 2015

(51) Int. Cl.
*H04W 4/00* (2009.01)
*H04W 76/02* (2009.01)
*H04W 8/00* (2009.01)

(52) U.S. Cl.
CPC ......... *H04W 76/021* (2013.01); *H04W 8/005* (2013.01); *H04W 4/005* (2013.01); *H04W 4/008* (2013.01); *H04W 76/023* (2013.01)

(58) Field of Classification Search
CPC .... H04W 40/246; H04W 48/16; H04W 4/008
USPC ....................... 370/328, 252, 329
See application file for complete search history.

(56) References Cited

U.S. PATENT DOCUMENTS

| | | | | |
|---|---|---|---|---|
| 2010/0009675 A1* | 1/2010 | Wijting | ........... | H04W 72/02 455/426.1 |
| 2010/0124196 A1* | 5/2010 | Bonar | ........... | H04B 7/0689 370/329 |
| 2011/0213871 A1* | 9/2011 | DiGirolamo | ........... | H04W 4/00 709/223 |

(Continued)

FOREIGN PATENT DOCUMENTS

| CN | 103731902 A | 4/2014 |
|---|---|---|
| GB | 2503508 A | 1/2014 |

OTHER PUBLICATIONS

3rd Generation Partnership Project; Technical Specification Group Services and System Aspects; Study on Architecture Enhancements to Support Proximity-Based Services, 3GPP TR 23.703 v12.0.0 (Feb. 2014).

(Continued)

*Primary Examiner* — Ricky Ngo
*Assistant Examiner* — Dewanda Samuel
(74) *Attorney, Agent, or Firm* — Duft Bornsen & Fettig, LLP (57) ABSTRACT

Systems and methods that configured a Layer-1 destination address for D2D communications. One embodiment is a controller in a network that receives a discovery request from first User Equipment (UE), identifies an application code to announce the first UE during a discovery procedure, and provides the application code to the first UE. The controller receives an address request from the first UE for a D2D communication with one or more second UEs identified during the discovery procedure. The controller (Continued)

derives a Layer-1 destination address for the D2D communication, and provides the Layer-1 destination address to the first UE and to the at least one second UE for pre-configuration of the Layer-1 destination address at the first UE and the at least one second UE before the D2D communication.

20 Claims, 6 Drawing Sheets

(56) References Cited

U.S. PATENT DOCUMENTS

| | | | | |
|---|---|---|---|---|
| 2013/0160101 | A1* | 6/2013 | Hakola | H04W 76/023 |
| | | | | 726/7 |
| 2013/0288668 | A1 | 10/2013 | Pragada et al. | |
| 2014/0078952 | A1* | 3/2014 | Bontu | H04W 76/023 |
| | | | | 370/312 |
| 2014/0130137 | A1* | 5/2014 | Baek | H04W 12/08 |
| | | | | 726/4 |
| 2014/0192739 | A1* | 7/2014 | Liao | H04W 4/023 |
| | | | | 370/329 |
| 2014/0254523 | A1* | 9/2014 | Chai | H04W 76/023 |
| | | | | 370/329 |
| 2014/0341121 | A1* | 11/2014 | Chang | H04W 40/246 |
| | | | | 370/329 |
| 2014/0341132 | A1* | 11/2014 | Kim | H04W 8/005 |
| | | | | 370/329 |

OTHER PUBLICATIONS

3rd Generation Partnership Project, Study on LTE Device to Device Proximity Services, 3GPP TR 36.843, Version 12.0.1 (Mar. 2014).
3rd Generation Partnership Project, Proximity-based Services, 3GPP TS 23.303, Version 12.0.0 (Feb. 2014).
3rd Generation Partnership Project, Feasibility Study for Proximity Services (ProSe), 3GPP TR 22.803, Version 12.2.0 (Jun. 2013).
3GPP TSG RAN Meeting #63, Work Item Proposal on LTE Device to Device Proximity Services, RP-140518 (Mar. 2014).
3GPP TSG RAN WG1 Meeting #77, System Control and Security for D2D Broadcast Communication, R1-142053 (May 2014).

* cited by examiner

CONFIGURATION OF LAYER-1 DESTINATION ADDRESS FOR DEVICE-TO-DEVICE COMMUNICATIONS

FIELD OF THE INVENTION

The invention is related to the field of communication systems and, in particular, to proximity services that provide device-to-device communications.

BACKGROUND

Proximity Services (ProSe) refer to services provided by a Third Generation Partnership Program (3GPP) system based on User Equipment (UEs) being in proximity to each other. In a Long Term Evolution (LTE) network, ProSe allows for device-to-device communications (D2D) as an underlay to the cellular network. In D2D communications, UEs transmit data signals to each other over a direct link using the cellular resources instead of routing the data signals through the core network. Therefore, D2D communications directly transmit traffic between UEs that are in the vicinity of one another instead of routing the traffic over a core network, such as the Evolved Packet Core (EPC). Because there is direct communication between UEs that are in close proximity, D2D communications offload traffic from the core network without additional infrastructure. D2D communications may also offer higher data rates, lower transfer delays, and better power efficiency within a UE.

SUMMARY

Embodiments described herein pre-configure a Layer-1 destination address for D2D communications between UEs. When a UE has discovered one or more other UEs for a D2D communication, the UE requests a destination address for the D2D communication from the network. There are no higher layers involved a D2D communication, so directory numbers, MAC addresses, etc., are not useful in the transmission of traffic or content between UEs in a direct manner. Therefore, a controller in the network derives a Layer-1 destination address for a D2D communication, and distributes the Layer-1 destination address to the UEs involved in the D2D communication. The originating UE may then insert the Layer-1 destination address into Layer-1 Resource Blocks, and transmit the Layer-1 resource blocks using the radio resources available to the originating UE. The radio resources may be cellular-type resources (e.g., E-UTRAN resources resident on the UE or through a base station), WLAN resources (e.g., WiFi), etc. The destination UE(s) may monitor the radio resources for Resource Blocks having the Layer-1 destination address, and decode these Resource Blocks to receive the content sent by the originating UE. The derivation of the Layer-1 destination address makes D2D communication possible without routing the content through the core network.

One embodiment comprises a controller configured to receive a discovery request from a first UE, to identify an application code to announce the first UE during a discovery procedure, and to provide the application code to the first UE. The controller is configured to receive an address request from the first UE for a D2D communication with at least one second UE identified during the discovery procedure, to derive a Layer-1 destination address for the D2D communication, and to provide the Layer-1 destination address to the first UE and to the at least one second UE for pre-configuration of the Layer-1 destination address at the first UE and the at least one second UE before the D2D communication.

In one embodiment, the controller is configured to derive the Layer-1 destination address based on the application code.

In one embodiment, the controller is configured to derive the Layer-1 destination address based on an application identifier (ID) provided in the address request by the first UE, where the application ID is an identity for an application on the first UE that initiates the D2D communication.

In one embodiment, the controller is configured to derive the Layer-1 destination address based on a communication mode for the D2D communication.

In one embodiment, the controller is configured to derive the Layer-1 destination address based on a UE identity (ID) for the at least one second UE.

In one embodiment, the controller is configured to define a validity timer for the Layer-1 destination address. The validity timer for the Layer-1 destination address is less than or equal to a validity timer for the application code.

In one embodiment, the controller is configured to push the Layer-1 destination address to the at least one second UE.

In one embodiment, the controller is configured to receive another address request from the at least one second UE, and to transmit an address response to the at least one second UE with the Layer-1 destination address in response to the other address request.

Another embodiment comprises a method for providing a D2D communication. The method includes receiving a discovery request in a controller in a network from a first UE, identifying an application code to announce the first UE during a discovery procedure, and providing the application code from the controller to the first UE. The method further includes receiving an address request from the first UE for a D2D communication with at least one second UE identified during the discovery procedure, deriving a Layer-1 destination address for the D2D communication, and providing the Layer-1 destination address to the first UE and to the at least one second UE for pre-configuration of the Layer-1 destination address at the first UE and the at least one second UE before the D2D communication.

Another embodiment comprises a first UE configured to transmit a discovery request to a controller in a mobile network, to receive a discovery response from the controller indicating an application code to use to announce the first UE for a proximity service, and to discover at least one second UE for a D2D communication. The first UE is configured to transmit an address request to the controller for the D2D communication with the at least one second UE, to receive an address response from the controller indicating a Layer-1 destination address for the D2D communication derived by the controller, and to initiate the D2D communication using radio resources based on the Layer-1 destination address.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
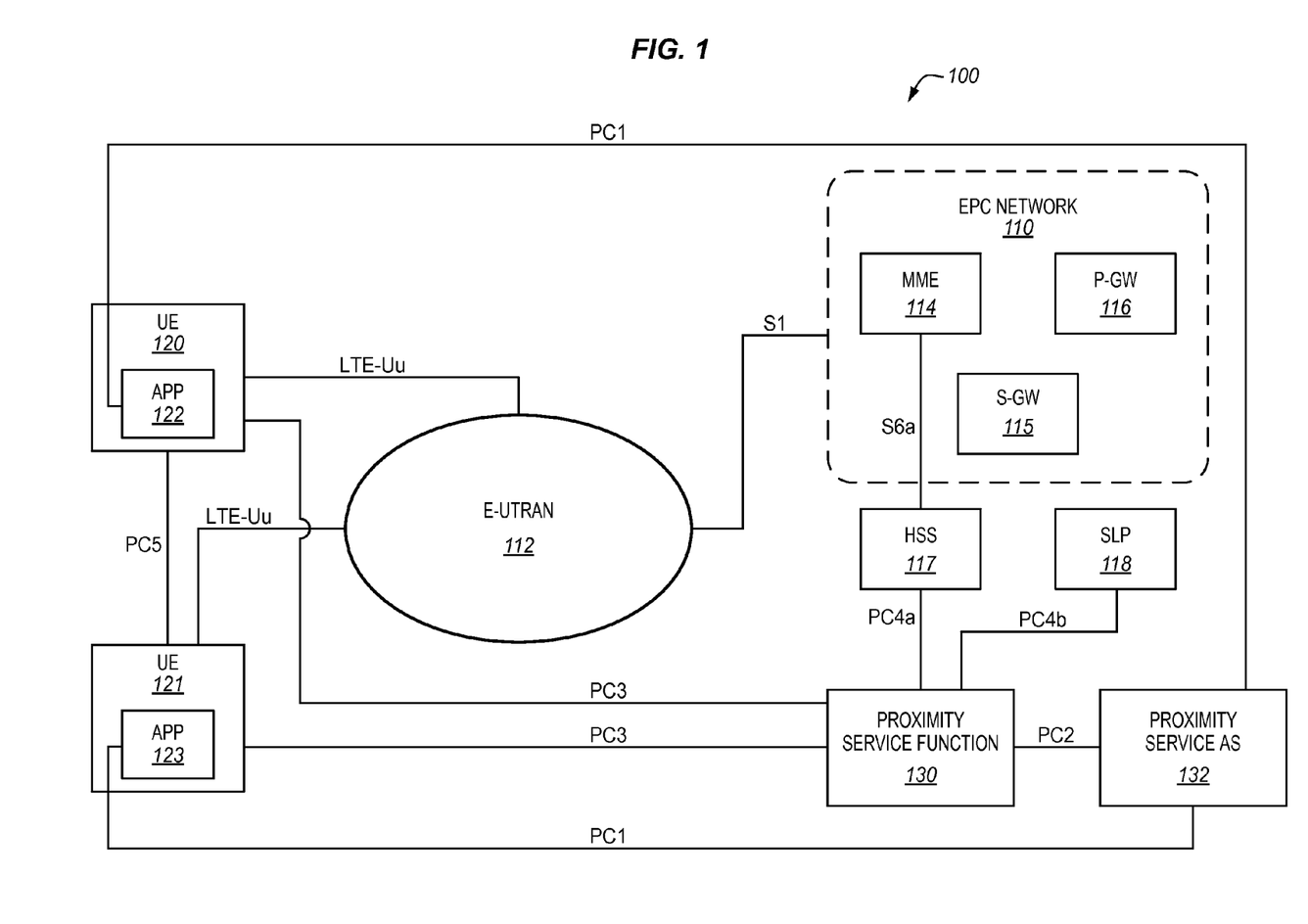
FIG. 1 illustrates a Public Land Mobile Network (PLMN) architecture for ProSe features in an LTE network.

FIG. 1 illustrates a Public Land Mobile Network (PLMN) architecture 100 for ProSe features in an LTE network. Architecture 100 is described in 3GPP TS 23.303 (v12.0.0), which is incorporated by reference as if fully included herein. Although 3GPP ProSe is discussed herein, the concepts discussed are applicable to any proximity service that enables direct communication between devices, also referred to as D2D communication. Architecture 100 includes an Evolved Packet Core (EPC) network 110 that communicates with UEs 120-121 over an access network, which is illustrated as an Evolved-UMTS Terrestrial Radio Access Network (E-UTRAN) 112. Although not shown in FIG. 1, E-UTRAN 112 includes a plurality of base stations (eNodeB) that provide wireless connections between UEs and EPC network 110. EPC network 110 includes a Mobility Management Entity 114, an S-GW 115, and a P-GW 116, but may include other elements not shown. The operation of these elements in EPC network 110 is outside of the scope of the embodiments described herein. Architecture 100 also includes a Home Subscriber Server (HSS) 117 and a Secure User Plane Location Platform (SLP) 118, which are also beyond the scope of the embodiments.

The architecture 100 in FIG. 1 illustrates a non-roaming scenario. However, there may be other architectures applicable to the embodiments described herein, such as an inter-PLMN architecture (see FIGS. 4.2-2 of 3GPP TS 23.303), a roaming architecture (see FIGS. 4.2-3 of 3GPP TS 23.303), an architecture when a UE is covered by a WLAN instead of an E-UTRAN, etc.

Architecture 100 further includes a Proximity Service (ProSe) function 130 and a ProSe Application Server (AS) 132. ProSe function 130 comprises any server, device, apparatus, or equipment (including hardware) that is used for network-related actions required for proximity-type services. ProSe function 130 plays different roles for each of the features of ProSe. ProSe AS 132 comprises any server, device, apparatus, or equipment (including hardware) that supports storage of EPC ProSe User IDs and ProSe Function IDs, and mapping of Application Layer User IDs and EPC ProSe User IDs.

UEs 120-121 comprise any devices used directly by an end user for communication, such as a mobile terminal, a laptop computer equipped with a mobile broadband adapter, etc. UEs 120-121 may be considered as ProSe-enabled, meaning that they support ProSe requirements and associated procedures. A ProSe-enabled UE as described herein refers to both a non-Public Safety UE and a Public Safety UE. Each UE 120-121 includes an application 122 and 123, respectively, that is used to access/provide proximity services (ProSe), such as D2D communication. The applications 122-123 may comprise a local voice service, multimedia content sharing, gaming, group multicast, content-aware applications, public safety, etc.

ProSe features include ProSe discovery and ProSe direct communication. ProSe discovery is a process that identifies a ProSe-enabled UE in proximity of other ProSe-enabled UEs. There are at least two types of discovery. One type of discovery is ProSe direct discovery, which is a process employed by a ProSe-enabled UE to discover other ProSe-enabled UEs in its vicinity by using only the capabilities of the two UEs. For example, one UE may use the LTE radio interface to discover the presence of other ProSe-enabled UEs in its vicinity. Another type of discovery is EPC-level ProSe discovery, which is a process by which EPC network 110 determines the proximity of two ProSe-enabled UEs and informs them of their proximity. For example, a server in EPC network 110 may monitor the location of ProSe-enabled UEs, and inform the UEs of their proximity.

ProSe direct communication is a communication between two or more UEs in proximity that are ProSe-enabled by means of user plane transmission using E-UTRA technology via a path not traversing any network node (other than a base station of an access network). ProSe direct communication allows the UEs to use the LTE radio interface to communicate directly with each other without routing traffic through EPC network 110. For example, ProSe UEs may directly communicate through the radio resources available to both UEs from an access network, such as from a base station. ProSe UEs may also directly communicate through the radio resources of the UEs themselves. Either way, the traffic exchanged between the UEs is not routed through the core network, but is routed directly between the UEs over a wireless interface.

Figure 2:
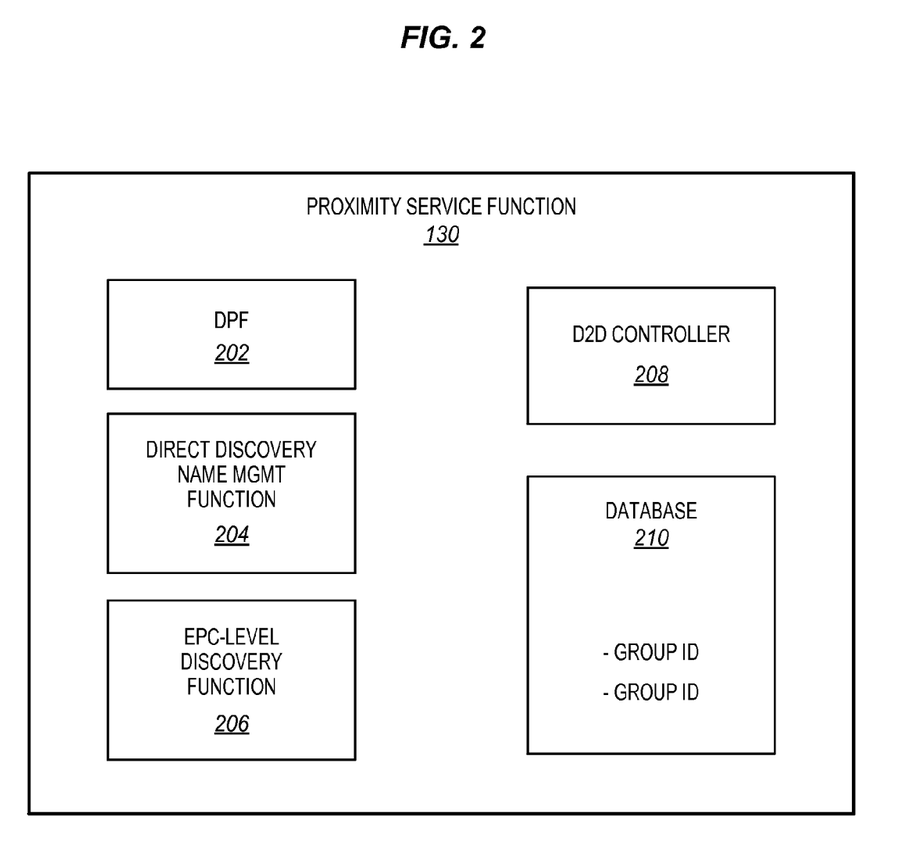
FIG. 2 illustrates a ProSe function in an exemplary embodiment.

ProSe function 130 is the entity that authorizes and controls use of ProSe features. FIG. 2 illustrates ProSe function 130 in an exemplary embodiment. In this embodiment, ProSe function 130 includes a Direct Provisioning Function (DPF) 202 that is configured to provision UEs with parameters for using ProSe direct discovery and ProSe direct communication. DPF 202 provisions the UEs with PLMN-specific parameters that allow the UEs to use ProSe features in the PLMN. ProSe function 130 further includes a direct discovery name management function 204 that is configured for open ProSe direct discovery to allocate and process the mapping of ProSe Applications IDs and ProSe Application Codes used in ProSe direct discovery. Direct discovery name management function 204 uses ProSe-related subscriber data stored in HSS 117 for authorization for each discovery request, and also provides the UEs with the necessary security material in order to protect discovery messages transmitted over-the-air. ProSe function 130 further includes an EPC-level discovery ProSe function 206 that is configured to authorize and configure the UEs for EPC-level ProSe discovery and EPC-assisted WLAN direct discovery.

In this embodiment, ProSe function 130 further includes a device-to-device (D2D) controller 208 and a database 210. D2D controller 208 and database 210 may be part of DPF 202, or may be separate entities. D2D controller 208 is configured to derive a Layer-1 destination address for D2D communications initiated between UEs. The physical layer (e.g., Layer 1 of the Open Systems Interconnection (OSI) model) is the layer that is responsible for the transmission of data over a medium. This physical layer is the lowest layer in the LTE protocol, and covers the downlink transmission from a base station/eNodeB (in E-UTRAN 112) to a UE and the uplink transmission from a UE to the base station/eNodeB. For instance, the physical layer may use frames to transport uplink data and downlink data. A UE may be allocated a time slot, frequency slot, etc., in a frame for sending or receiving data in the physical layer. In a D2D communication, a UE may use uplink radio resources only.

Database 210 comprises any storage device configured to store data regarding D2D communications. For example, database 210 may store group identifiers (ID) for a group of UEs. Within database 210, the group ID may be mapped to a plurality of UE IDs for the UEs in the group. Database 210 may also store D2D contexts for D2D communications established between UEs. A D2D context is a block of information associated with a particular D2D communication or application code.

Although D2D controller 208 is illustrated in ProSe function 130, controller 208 may be used for any type of proximity service other than ProSe as defined by the 3GPP.

To initiate a ProSe feature between UE 120 and UE 121, for example, the procedure for ProSe discovery occurs. For ProSe (direct) discovery, UE 120 is considered the "announcing UE" as it announces certain information that could be used by UEs in proximity that have permission to discover. UE 121 is considered the "monitoring UE" as it monitors certain information of interest in proximity of the announcing UE. In this model, the announcing UE broadcasts discovery messages at pre-defined discovery intervals and the monitoring UEs that are interested in these messages read them and process them.

Figure 3:
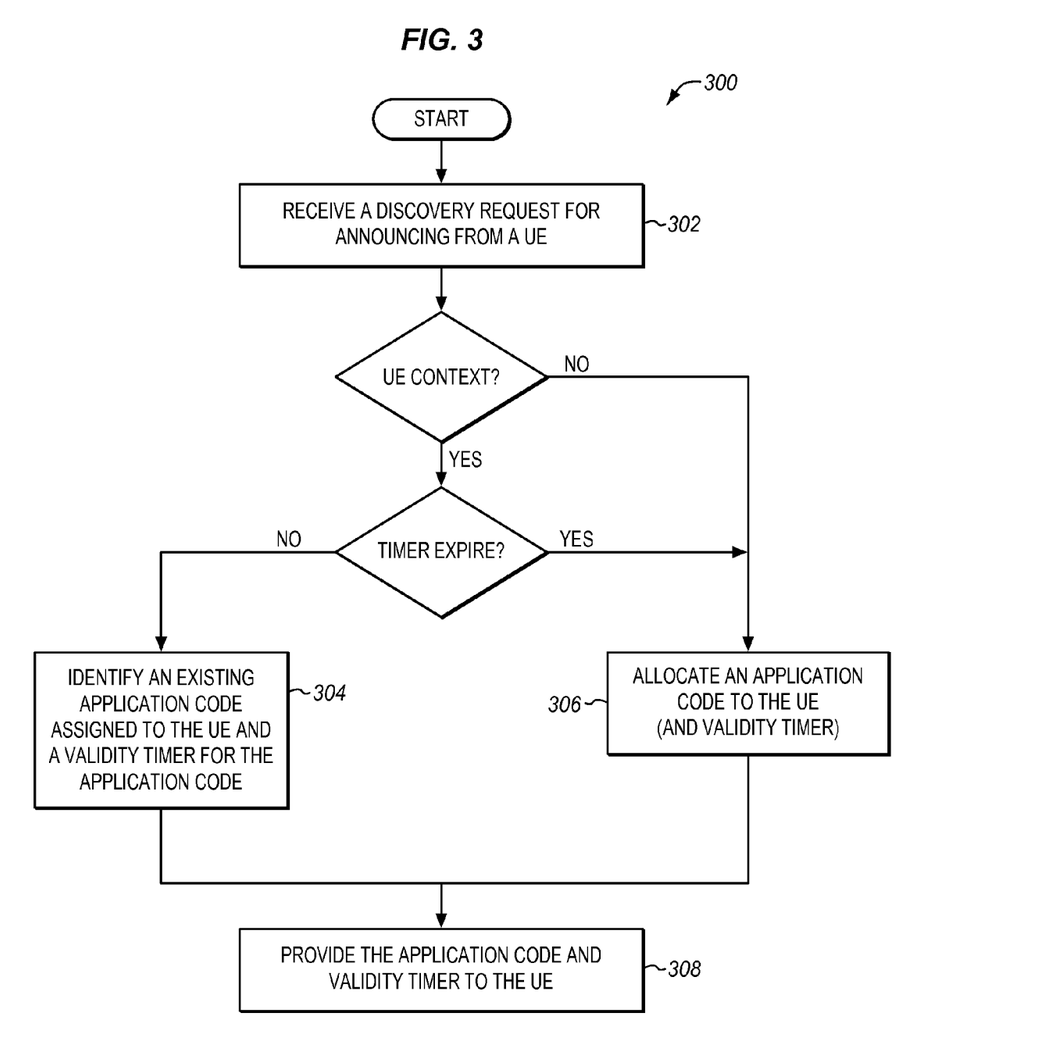
FIG. 3 is a flow chart illustrating a discovery procedure for a D2D communication.

FIG. 3 is a flow chart illustrating a discovery procedure for a D2D communication. The steps of method 300 will be described with reference to UE 120 and D2D controller 208 in FIGS. 1-2, but those skilled in the art will appreciate that method 300 may be performed in other systems. Also, the steps of the flow charts described herein are not all inclusive and may include other steps not shown, and the steps may be performed in an alternative order.

For the discovery procedure, UE 120 sends a discovery request for announcing that is received by D2D controller 208 (step 302). The discovery request may include an application ID, a UE ID, an announce command, and/or an application identity. The application ID is an identity for identifying application-related information that is globally unique across all PLMNs. For example, if an application in UE 120 is a social network application (e.g., Facebook®), then a unique application ID may be assigned to that application across all PLMNs. The application ID may therefore indicate an application that initiates a D2D communication from UE 120. The UE ID is a unique identity for UE 120, which may comprise a string that resembles a serial number, an IMSI, MSISDN, etc. The announce command indicates that UE 120 wants to announce its presence to other UEs (e.g., command=announce). The application identity represents a unique identifier of the UE application that has triggered the discovery request.

D2D controller 208 then determines if a UE context already exists for UE 120. A UE context is a block of information associated with an active UE. If there is an existing UE context, then D2D controller 208 identifies an existing application code (e.g., ProSe Application Code) assigned to UE 120 and a validity timer for the application code (step 304). An application code is used by an announcing UE to announce its presence to other UEs. An announcing UE transmits the application code over the radio resources during an announce procedure by the UE. The application code may be a temporary identity that corresponds with the application ID, and a PLMN ID of ProSe function 130 that assigned the application code (i.e., Mobile Country Code (MCC) and Mobile Network Code (MNC)).

If there is no existing UE context, then D2D controller 208 creates a new UE context for UE 120 and allocates an application code to UE 120 (step 306). D2D controller 208 may also allocate a validity timer for the application code in step 306. The validity timer indicates how long the application code is valid. D2D controller 208 then provides the application code and validity timer to UE 120 (step 308). For example, D2D controller 208 may send a discovery response directly to UE 120 (over PC3 interface) with the application code, or may send the discovery response to UE 120 through EPC network 110 and E-UTRAN 112. UE 120 may then begin announcing the application code using radio resources during the duration of the validity timer. Radio resources as discussed herein comprise any resources of a wireless network that provide Layer-1 (physical layer) communications. When the validity timer expires, UE 120 needs to request a new application code or new timer.

UE 121 performs discovery in a similar manner as described in FIG. 3. UE 121 sends a discovery request to D2D controller 208. The discovery request may include an application ID, a UE ID for UE 121, a monitor command, and/or an application identity. The monitor command indicates that UE 121 wants to monitor for the presence of other UEs (e.g., command=monitor). D2D controller 208 then determines if a UE context already exists for UE 121. If there is an existing UE context, then D2D controller 208 identifies a discovery filter allocated for the UE context. A discovery filter includes an application code and application mask for monitoring application codes over the radio resources. The discovery filter also includes a validity timer (i.e., Time to Live (TTL)) that indicates how long the discovery filter is valid. If there is no associated UE context, then D2D controller 208 creates a new UE context for UE 121 and identifies a discovery filter for UE 121 based on the application code assigned for discovery. D2D controller 208 then provides the discovery filter to UE 121.

With UE 120 announcing its application code over the radio resources and UE 121 monitoring the radio resources using the discovery filter, it is assumed that UE 120 discovers UE 121. After discovery, a user of UE 120 may select an option provided by application 122 to initiate a direct communication with UE 121. For example, the user of UE 120 may request a voice call with a user of UE 121, may request to send a picture or video to a user of UE 121, etc. UE 120 may then initiate the direct communication (i.e., D2D communication) with UE 121 as discussed below.

Figure 4:
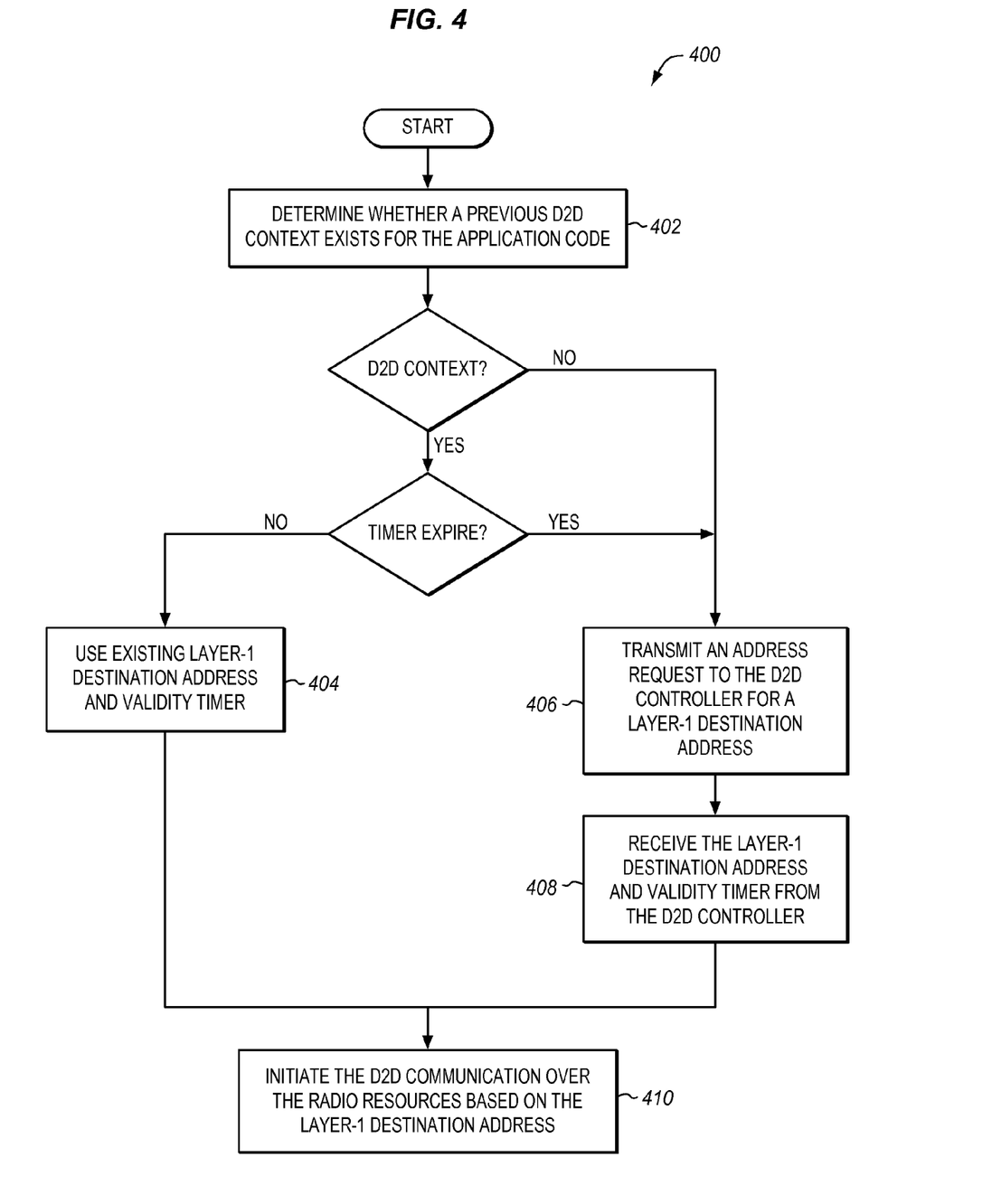
FIGS. 4-5 are flow charts illustrating a method for initiating a D2D communication in an exemplary embodiment.
Figure 5:
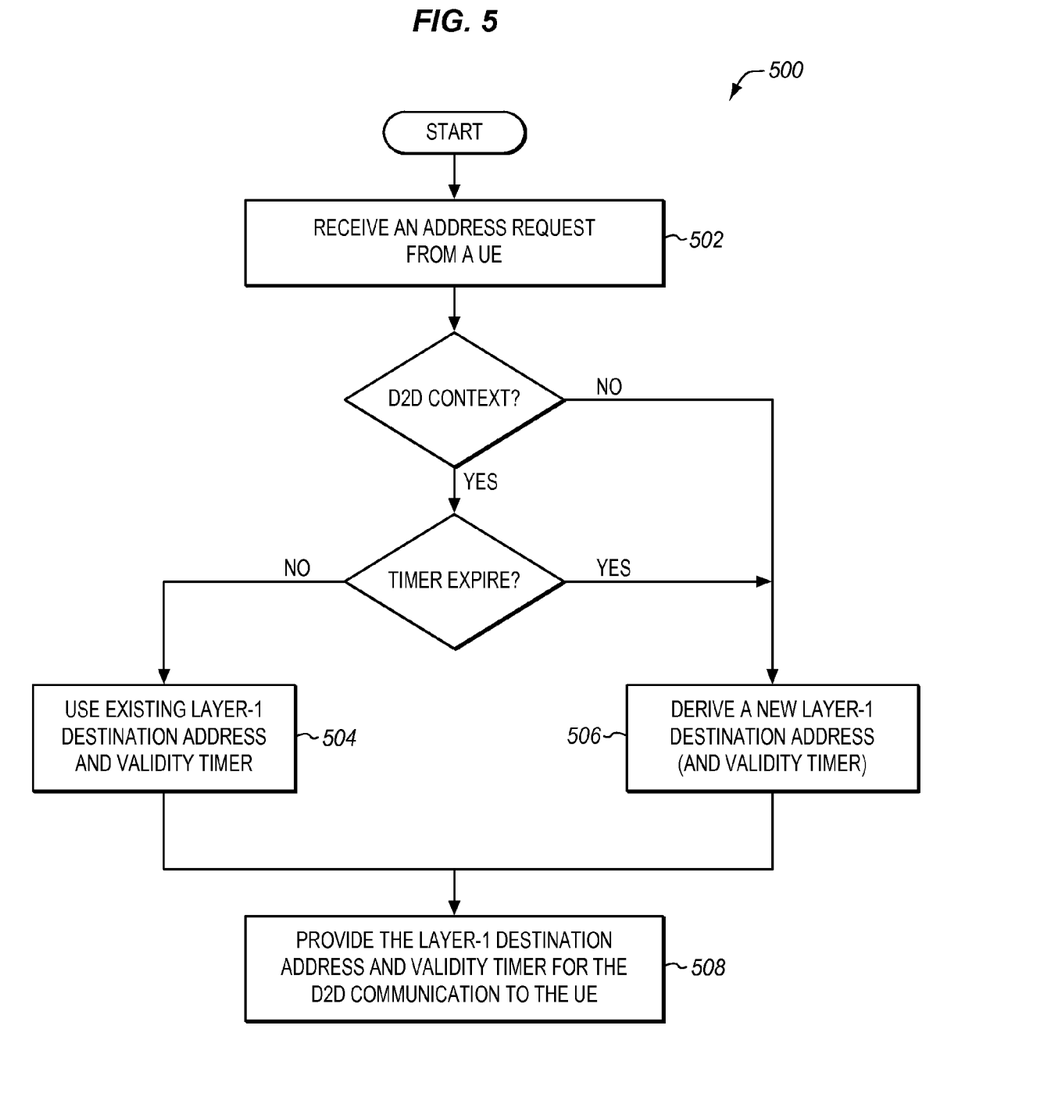

FIGS. 4-5 are flow charts illustrating a method 400 for initiating a D2D communication in an exemplary embodiment. The steps of method 400 will be described with reference to UE 120 and D2D controller 208 in FIGS. 1-2, but those skilled in the art will appreciate that method 400 may be performed in other systems.

To begin the D2D communication in FIG. 4, UE 120 first acquires a Layer-1 destination address for UE 121 (if a desired destination address is not configured at UE 120, or if a destination address is configured but the validity timer has expired with the destination address). To acquire the Layer-1 destination address, UE 120 determines whether a previous D2D context exists for the application code (step 402) allocated by D2D controller 208. If a D2D context exists, then a Layer-1 destination address has already been derived for the D2D context. Therefore, UE 120 determines whether a validity timer for the Layer-1 destination address has expired. If a previous D2D context exists and the validity timer has not expired, then UE 120 uses the existing Layer-1 destination address (step 404) previously allocated.

If a previous D2D context does not exist or if the validity timer has expired, then UE 120 transmits an address request to D2D controller 208 for a Layer-1 destination address (step 406). In order to transmit information over the LTE radio resources, UE 120 needs an address to insert in the Resource Blocks of the LTE physical layer. The request from UE 120 may include a proposed communication mode (e.g., unicast, groupcast, or broadcast), the application ID, the application code(s), a UE ID for the destination UE (i.e., UE 121), and/or a requested validity timer.

In FIG. 5, D2D controller 208 receives the address request from UE 120 (step 502). In response to the address request, D2D controller 208 identifies a Layer-1 destination address for the D2D communication. When identifying the Layer-1 destination address, D2D controller 208 may determine whether a D2D context exists for the application ID and application code(s). If a D2D context exists, then a Layer-1 destination address has already been derived for the D2D context. Therefore, D2D controller 208 determines whether a validity timer for the Layer-1 destination address has expired. If a previous D2D context exists and the validity timer has not expired, then D2D uses the existing Layer-1 destination address (step 504) previously allocated.

If a previous D2D context does not exist or if the validity timer has expired, then D2D controller 208 derives a new Layer-1 destination address (step 506). In one embodiment, D2D controller 208 may derive the Layer-1 destination address based on the application code and/or the application ID. In another embodiment, D2D controller 208 may derive the Layer-1 destination address based on a communication mode. The communication mode refers to the type of communication requested, such as unicast, groupcast, or broadcast. One Layer-1 destination address may be mapped to one communication mode. D2D controller 208 may derive the Layer-1 destination address based on the communication mode requested by UE 120 (in the address request), or D2D controller 208 may override the communication mode requested by UE 120 based on a rules engine. In another embodiment, D2D controller 208 may derive the Layer-1 destination address based on a UE ID for the destination UE (i.e., UE 121). D2D controller 208 may derive the Layer-1 destination address based on any of the above information in combination or any other available information.

D2D controller 208 may also derive a validity timer for the Layer-1 destination address in step 506. To derive the validity timer, D2D controller 208 may use the same validity timer as the application code allocated during discovery. D2D controller 208 may alternatively derive a different validity timer for the Layer-1 destination address as long as the validity timer for the Layer-1 destination address is not greater than the validity timer for the application code.

The Layer-1 destination address may be associated with one or multiple ProSe Application Code(s) identifying a D2D group or subgroup. Alternatively, different Layer-1 destination addresses may be associated with different ProSe Application Code(s) and/or filters, or with overlap among them.

D2D controller 208 then provides the Layer-1 destination address and validity timer for the D2D communication to UE 120 (step 508) for pre-configuration of the Layer-1 destination address at UE 120. UE 120 is pre-configured by D2D controller 208 with the Layer-1 destination address before the D2D communication occurs. D2D controller 208 may send an address response directly to UE 120 (over PC3 interface) with the Layer-1 destination address and validity timer, or may send the address response to UE 120 through EPC network 110 which may use an existing provisioning mechanism to pre-configure the Layer-1 destination address to UE 120, such as over-IP or over-the-air (OTA). In addition to sending the Layer-1 destination address to UE 120, D2D controller 208 also provides the Layer-1 destination address to the destination UEs for the D2D communication for pre-configuration of the Layer-1 destination address at these UEs. In this example, D2D controller 208 also sends the Layer-1 destination address to UE 121.

In FIG. 4, UE 120 receives the Layer-1 destination address and validity timer from D2D controller 208 (step 408), and stores them locally. UE 120 then initiates the D2D communication over the radio resources based on the Layer-1 destination address (step 410). For example, UE 120 may insert the Layer-1 destination address in a Resource Block (RB) of the uplink physical layer for a D2D communication channel. In resource allocation of D2D broadcasting, a Scheduling Assignment (SA) can be transmitted before data transmission in the time domain. The Layer-1 destination address may be scrambled in the Scheduling Assignment (SA).

UE 121 also receives the Layer-1 destination address from D2D controller 208. UE 121 may then monitor the radio resources to identify Resource Blocks that include the Layer-1 destination address. UE 121 decodes these Resource Blocks to receive the content directly from UE 120.

Figure 6:
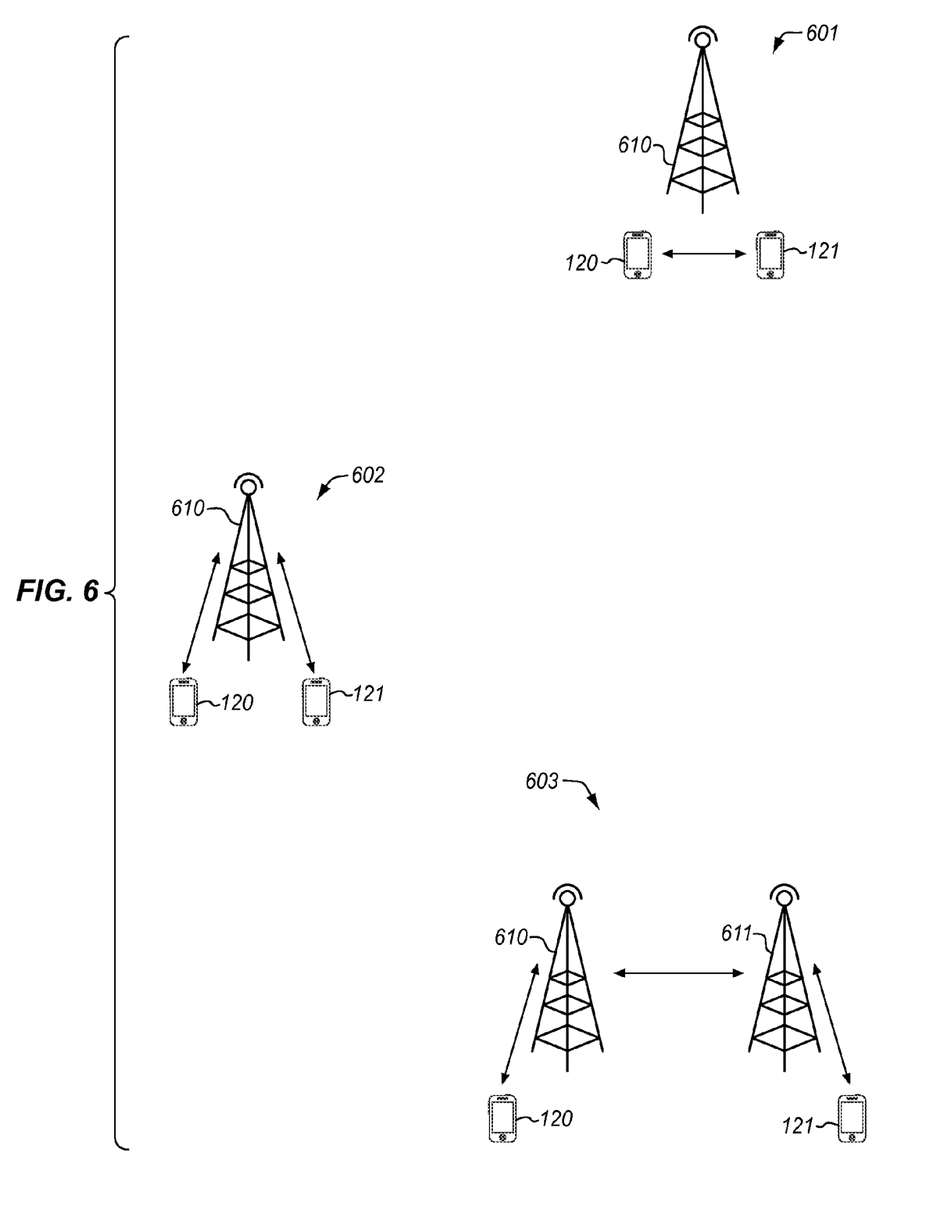
FIG. 6 illustrates scenarios for D2D communication in an exemplary embodiment.

The D2D communication may occur in different ways. FIG. 6 illustrates scenarios for D2D communication in an exemplary embodiment. In scenario 601, UE 120 communicates directly with UE 121 over radio resources without use of a base station 610. The radio resources used in scenario 601 are provided by the UEs themselves. In scenario 602, UE 120 communicates directly with UE 121 through radio resources provided by a base station 610. The radio resources used in scenario 602 are provided by base station 610, as both UE 120 and UE 121 are in the coverage area of base station 610. In scenario 603, UE 120 communicates with base station 610, UE 121 communicates with base station 611, and there is a communication path from base station 610 to base station 611 (e.g., X2 interface). In scenario 603, the radio resources used by UE 120 are provided by base station 610, and the radio resources used by UE 121 are provided by base station 611. Base stations 610 and 611 exchange signals directly, such as over an X2 interface, to provide the D2D communication. In each of these scenarios, the communication path between UE 120 and 121 does not go over the core network (i.e., EPC network 110) and is only over the radio resources of the access network or the UEs themselves.

As stated above, the D2D communications may be unicast between UE 120 and UE 121. In other embodiments, D2D communications may also be to a group of UEs in the vicinity of UE 120 (multicast or groupcast), or to all UEs in the vicinity of UE 120 (broadcast).

The embodiment described in FIGS. 4-5 illustrates a pull model for provisioning the Layer-1 destination address in UE 120 (and UE 121). A push model may also be used to provision the Layer-1 destination address. When UE 120 sends a discovery request to D2D controller 208 as in FIG. 3, D2D controller 208 may derive a Layer-1 destination address for the D2D communication. For example, the discovery request may indicate an application ID, a UE ID for UE 120, a UE ID for one or more destination UEs, an announce command, an application identity, and a proposed communication mode. D2D controller 208 may derive a Layer-1 destination address in response to the discovery request, and store the Layer-1 destination address in database 210 (see FIG. 2). D2D controller 208 may then push the Layer-1 destination address to the originating UE (i.e., UE 120) and the destination UEs (i.e., UE 121). Therefore, the UEs may not need to separately request the Layer-1 destination address from D2D controller 208. D2D controller 208 may use E-UTRAN 112 or non-E-UTRAN resources to pre-configure the Layer-1 destination address to UE 120 and/or other UEs.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
a controller configured to receive a discovery request from first User Equipment (UE) that includes an application identifier (ID) assigned to an application within the first UE that provides a proximity service, to identify an application code to announce the first UE during a discovery procedure for the proximity service, and to provide the application code to the first UE;
the controller configured to receive an address request from the first UE to initiate a device-to-device (D2D) communication with at least one second UE identified during the discovery procedure, and to determine whether a D2D context exists for the application ID and the application code;
when a D2D context does not exist for the application ID and the application code, the controller is configured to derive a Layer-1 destination address for the D2D communication based on at least one of the application ID and the application code, and to provide the Layer-1 destination address to the first UE for pre-configuration of the Layer-1 destination address at the first UE before the D2D communication.

2. The apparatus of claim 1 wherein:
when the D2D context exists for the application ID and the application code, the controller is configured to determine that the Layer-1 destination address has previously been derived for the D2D context, to determine whether a validity timer for the Layer-1 destination address has expired, and to use the Layer-1 destination address previously derived if the validity timer has not expired.

3. The apparatus of claim 1 wherein:
the controller is configured to derive the Layer-1 destination address based on a communication mode requested for the D2D communication.

4. The apparatus of claim 3 wherein:
the communication mode comprises unicast, groupcast, or broadcast; and
the Layer-1 destination address is mapped to one communication mode.

5. The apparatus of claim 1 wherein:
the controller is configured to derive the Layer-1 destination address based on a UE identity (ID) for the at least one second UE.

6. The apparatus of claim 1 wherein:
the controller is configured to define a validity timer for the Layer-1 destination address, and to provide the validity timer for the Layer-1 destination address to the first UE; and
the validity timer for the Layer-1 destination address is less than or equal to a validity timer for the application code.

7. The apparatus of claim 1 wherein:
the controller is configured to push the Layer-1 destination address to the at least one second UE for pre-configuration of the Layer-1 destination address at the at least one second UE before the D2D communication.

8. The apparatus of claim 1 wherein:
the controller is configured to receive another address request from the at least one second UE, and to provide the Layer-1 destination address to the at least one second UE for pre-configuration of the Layer-1 destination address at the at least one second UE before the D2D communication in response to the other address request.

9. A method comprising:
receiving a discovery request in a controller in a network from first User Equipment (UE), wherein the discovery request includes an application identifier (ID) assigned to an application within the first UE that provides a proximity service;
identifying an application code to announce the first UE during a discovery procedure for the proximity service;
providing the application code from the controller to the first UE;

receiving an address request from the first UE to initiate a device-to-device (D2D) communication with at least one second UE identified during the discovery procedure;

determining whether a D2D context exists for the application ID and the application code;

when a D2D context does not exist for the application ID and the application code, deriving a Layer-1 destination address for the D2D communication based on at least one of the application ID and the application code, and providing the Layer-1 destination address to the first UE for pre-configuration of the Layer-1 destination address at the first UE before the D2D communication.

10. The method of claim 9 further comprising:
when the D2D context exists for the application ID and the application code, determining that the Layer-1 destination address has previously been derived for the D2D context, determining whether a validity timer for the Layer-1 destination address has expired, and using the Layer-1 destination address previously derived if the validity timer has not expired.

11. The method of claim 9 wherein deriving the Layer-1 destination address comprises:
deriving the Layer-1 destination address based on a communication mode requested for the D2D communication.

12. The method of claim 11 wherein:
the communication mode comprises unicast, groupcast, or broadcast; and
the Layer-1 destination address is mapped to one communication mode.

13. The method of claim 9 wherein deriving the Layer-1 destination address comprises:
deriving the Layer-1 destination address based on a UE identity (ID) for the at least one second UE.

14. The method of claim 9 further comprising:
defining a validity timer for the Layer-1 destination address; and
providing the validity timer for the Layer-1 destination address to the first UE;
wherein the validity timer for the Layer-1 destination address is less than or equal to a validity timer for the application code.

15. The method of claim 9 further comprising:
pushing the Layer-1 destination address to the at least one second UE for pre-configuration of the Layer-1 destination address at the at least one second UE before the D2D communication.

16. The method of claim 9 further comprising:
receiving another address request from the at least one second UE; and
providing the Layer-1 destination address to the at least one second UE for pre-configuration of the Layer-1 destination address at the at least one second UE before the D2D communication in response to the other address request.

17. An apparatus comprising:
first User Equipment (UE) that includes an application that provides a proximity service;
the first UE is configured to transmit a discovery request to a controller in a mobile network that includes an application identifier (ID) assigned to the application, to receive a discovery response from the controller indicating an application code to use to announce the first UE for the proximity service, and to discover at least one second UE for a device-to-device (D2D) communication;
the first UE configured to transmit an address request to the controller for the D2D communication with the at least one second UE, to receive an address response from the controller indicating a Layer-1 destination address for the D2D communication derived by the controller based on at least one of the application ID and the application code, and to initiate the D2D communication using radio resources based on the Layer-1 destination address derived by the controller.

18. The apparatus of claim 17 wherein:
the first UE is configured to insert the application code in the address request.

19. The apparatus of claim 17 wherein:
the first UE is configured to insert a communication mode for the D2D communication in the address request.

20. The apparatus of claim 17 wherein:
the address response from the controller further includes a validity timer for the Layer-1 destination address.

* * * * *